(12) United States Patent
Pfeilschifter et al.

(10) Patent No.: US 11,072,253 B2
(45) Date of Patent: Jul. 27, 2021

(54) POWER CIRCUIT FOR POWER SUPPLY IN AN ELECTRICALLY DRIVEN VEHICLE AND STATIONARY ENERGY SUPPLY SYSTEM

(71) Applicant: CONTINENTAL AUTOMOTIVE GMBH, Hannover (DE)

(72) Inventors: Franz Pfeilschifter, Regensburg (DE); Martin Brüll, Barbing (DE); Hans-Peter Feustel, Roth (DE); Klaus Mühlbauer, Friedenfels (DE); Thomas Röhrl, Barbing (DE); Edmund Schirmer, Nuremberg (DE); Martin Spornraft, Rottenburg (DE); Matthias Töns, Rogensburg (DE)

(73) Assignee: Vitesco Technologies GmbH, Hannover (DE)

( * ) Notice: Subject to any disclaimer, the term of this patent is extended or adjusted under 35 U.S.C. 154(b) by 153 days.

(21) Appl. No.: 15/730,483

(22) Filed: Oct. 11, 2017

(65) Prior Publication Data
US 2018/0029486 A1 Feb. 1, 2018

Related U.S. Application Data

(63) Continuation of application No. PCT/EP2016/057504, filed on Apr. 6, 2016.

(30) Foreign Application Priority Data

Apr. 23, 2015 (DE) .................... 10 2015 207 413.7

(51) Int. Cl.
*B60L 53/24* (2019.01)
*B60L 53/20* (2019.01)
(Continued)

(52) U.S. Cl.
CPC ............. *B60L 53/24* (2019.02); *B60L 7/14* (2013.01); *B60L 11/1814* (2013.01);
(Continued)

(58) Field of Classification Search
CPC ...... B60L 11/1814; B60L 53/24; B60L 53/20; B60L 53/14; B60L 55/00; B60L 53/30;
(Continued)

(56) References Cited

U.S. PATENT DOCUMENTS 5,504,414 A  4/1996 Kinoshita
8,773,065 B2 *  7/2014 Ang ................... B60L 11/1811
                                                 320/104
(Continued)

FOREIGN PATENT DOCUMENTS

CN  103650285 A   3/2014
DE  102008063465 A1  6/2010
(Continued)

OTHER PUBLICATIONS

International Search Report and Written Opinion dated Jun. 27, 2016 from corresponding International Patent Application No. PCT/EP2016/057504.
(Continued)

*Primary Examiner* — Drew A Dunn
*Assistant Examiner* — Sailesh Thapa

(57) ABSTRACT

The disclosure relates to a power circuit for power supply in an electrically driven vehicle. The power circuit includes a direct voltage connection, an electrical traction drive, and a DC/AC converter. The converter includes an alternating voltage side connected to the traction drive. A DC/DC converter of the power circuit includes two converter sides. The first converter side is connected to a direct voltage side of the DC/AC converter via a coupling point. The direct voltage connection is likewise connected to the coupling (Continued)

point. The disclosure further relates to a stationary energy supply system designed to be complementary and to connect to the power circuit.

10 Claims, 3 Drawing Sheets

(51) Int. Cl.
*B60L 55/00* (2019.01)
*B60L 11/18* (2006.01)
*B60L 7/14* (2006.01)
*B60L 15/00* (2006.01)
*H02J 7/02* (2016.01)
*H02M 3/155* (2006.01)

(52) U.S. Cl.
CPC ............ *B60L 15/007* (2013.01); *B60L 53/20* (2019.02); *B60L 55/00* (2019.02); *H02J 7/022* (2013.01); *B60L 2210/12* (2013.01); *B60L 2210/14* (2013.01); *B60L 2210/30* (2013.01); *B60L 2220/54* (2013.01); *H02M 2003/1552* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y04S 10/126* (2013.01)

(58) Field of Classification Search
CPC ...... B60L 7/14; B60L 15/007; B60L 2210/30; B60L 2220/54; B60L 2210/14; B60L 2210/12; B60L 1/003; H02J 7/022; Y02E 60/721; Y02E 60/00; Y04S 10/126; Y02T 90/127; Y02T 90/128; Y02T 90/14; Y02T 90/121; Y02T 90/163; Y02T 10/7072; Y02T 10/7225; Y02T 10/7233; Y02T 10/7005; Y02T 10/70; Y02T 10/72; Y02T 90/12; Y02T 90/16; Y02T 10/92; H02M 2003/1552

See application file for complete search history.

(56) References Cited

U.S. PATENT DOCUMENTS

| | | | |
|---|---|---|---|
| 2011/0151132 A1 | 6/2011 | Nagaraj et al. | |
| 2011/0248563 A1* | 10/2011 | Komma | B60L 53/24 307/9.1 |
| 2012/0032633 A1* | 2/2012 | Cordes | B60L 15/007 320/108 |
| 2012/0068663 A1* | 3/2012 | Tanikawa | B60L 58/20 320/109 |
| 2012/0326668 A1* | 12/2012 | Ballatine | B60L 53/54 320/109 |
| 2013/0020993 A1* | 1/2013 | Taddeo | H02J 7/0027 320/109 |
| 2016/0152129 A1* | 6/2016 | West | B60L 5/36 307/10.1 |

FOREIGN PATENT DOCUMENTS

| | | |
|---|---|---|
| JP | 2010041819 A | 2/2010 |
| WO | 2010115867 A1 | 10/2010 |
| WO | 2011151131 A1 | 12/2011 |
| WO | WO2011151131 A1 | 12/2011 |
| WO | 2012162570 A1 | 11/2012 |
| WO | WO2012162570 A1 | 11/2012 |

OTHER PUBLICATIONS

German Office Action dated May 13, 2015 for corresponding German Patent Application No. 10 2015 207 413.7.
Chinese Office Action dated Nov. 29, 2018 for corresponding Chinese Patent Application No. 201680005257.3.

* cited by examiner

POWER CIRCUIT FOR POWER SUPPLY IN AN ELECTRICALLY DRIVEN VEHICLE AND STATIONARY ENERGY SUPPLY SYSTEM

CROSS-REFERENCE TO RELATED APPLICATIONS

This application claims the benefit of PCT Application PCT/EP2016/057504, filed Apr. 6, 2016, which claims priority to German Application DE 10 2015 207 413.7, filed Apr. 23, 2017. The disclosures of the above applications are incorporated herein by reference.

TECHNICAL FIELD

The disclosure relates to the field of electro-mobility and, in particular, to the connection or functional integration of corresponding vehicles in electrical supply networks.

BACKGROUND

The components of an electro-mobility system are usually restricted to the use of only one type of current (that is to say alternating current (AC) or direct current (DC)). To produce an electromagnetic rotary field, alternating current has to be necessarily used, for example when using non-commutating electrical machines, whereas the storage of electrical energy in a battery or the photovoltaic production of electrical energy, for instance, requires the use of DC voltage. The type of current (or else the voltage level) must therefore be changed when coupling these different components, as a result of which complicated power-electronic actuators for converting electrical energy ("energy converters") become necessary, which actuators are linked to high costs. Furthermore, costly electronic power components are required for control when coupling different types of current.

SUMMARY

One aspect of the disclosure uses a DC voltage connection to connect external installations (for instance a DC supply network, for instance an island network such as that of a solar installation), which DC voltage connection is connected to a linking point which connects a DC/DC converter and a DC/AC converter to one another. The DC/DC converter and the DC/AC converter may be in a vehicle; for example, the DC voltage connection is on the vehicle side. The DC/AC converter may be an inverter, for example, a traction inverter, that is to say an inverter that is connected to an electrical machine or to a connection for the latter, the electrical machine driving wheels of the vehicle. The DC/AC converter may be an inverter of an electrical machine, such as of an engine (for instance an internal combustion engine starter or a starter/generator), or the inverter of an electrical machine of a compressor (for instance an air-conditioning compressor or a compressor of an internal combustion engine charging apparatus).

Therefore, the object of the disclosure is to show a possible way of connecting components of such a system to one another with less effort.

In some implementations, the DC/AC converter may also be an inverter of a charging apparatus. In this case, the charging apparatus is formed by the DC/DC converter, as is illustrated with the reference symbol 50 in FIG. 1 for instance, and the DC/AC converter, as is illustrated with the reference symbol 40 in FIG. 1 for instance. Alternatively, the DC/AC converter itself may implement the charging apparatus (in particular without a further converter), energy stores being charged via the DC side of the DC/AC converter, for example via the DC connection. The variant mentioned last makes it possible to transmit energy from a vehicle-side electrical energy store to a stationary DC network.

The DC/DC converter may be a converter of a charging apparatus or a converter for the DC/AC converter which in turn is set up to connect an electrical machine. In some examples, the DC/DC converter is a converter of a charging apparatus that is connected to the linking point or to the DC/AC converter.

One or more DC/DC converters and/or one or more DC/AC converters may be connected to the linking point. The DC/AC converter is set up, for example, to convert a direct current or a DC voltage into an alternating current or an AC voltage. In some examples, the DC/AC converter is also configured for the opposite direction. In this case, this is referred to as a bidirectional converter.

The DC/DC converter may be a converter of a charging apparatus. The linking point of the DC/DC converter is connected to an electrical energy store (stationary or vehicle-related) to be charged or to a connection for the latter (for example, in the case of a stationary energy store). The power circuit may also have an electrical machine or a connection for the latter. In this case, the AC side of the DC/AC converter is connected to the electrical machine or to the connection for the latter. The DC/AC converter forms an inverter for the electrical machine in this case.

As a result of the supply to such a central point, namely the linking point of the DC/DC converter and the DC/AC converter (or its DC side), numerous components may be used effectively. A power circuit which is both bidirectional (and therefore identical components are used for different functions) and is also used both for charging and for traction is proposed. In some implementations, the DC/DC converter can be used in a bidirectional manner, with the result that its components can be used both when charging an (in particular vehicle-side) energy store and during discharging, that is to say when obtaining power for operating a traction drive. Furthermore, the DC/DC converter may be unidirectional or may be set up to transmit electrical energy from the DC voltage connection to a (vehicle-side) energy store connection. Therefore, the DC/DC converter can be set up to receive and convert electrical energy from the DC voltage connection, the DC/DC converter being unidirectional or bidirectional.

Furthermore, an (additional) AC connection may be readily integrated, the integration not requiring any additional components apart from possibly required filters and/or selection switches. Rather, it is possible for both AC power (for instance from a general supply network) and DC power (for instance from a photovoltaic installation or another DC island network) to be used at the same time to charge the electrical energy store. It is possible to provide an automatic selection system which is set up to detect the voltage applied to the connections in order to increase or reduce the voltage at the linking point according to the desired energy flow or to set operating parameters of the inverter according to the desired energy flow. In some examples, the automatic selection system may be set up to detect whether one or more phases of an AC voltage signal are present at the AC connection in order to be able to accordingly set the inverter (on the input side). This considerably simplifies the connection, while a plurality of connection types (AC or DC) are simultaneously or alternatively available.

A power circuit for supplying power in an electrically driven vehicle, which is integrated in the electrical system of the vehicle, is therefore described. The power circuit includes a DC voltage connection that can be connected to an electrical clutch on the outside of the vehicle, with the result that electrical contact can be established with the power circuit from the outside. The DC voltage connection is used to charge the vehicle, but energy can also flow through the DC voltage connection in both directions, for instance if a traction battery of the vehicle is used to support a connected stationary supply network (island network or general supply network). In some examples, the DC voltage connection is designed according to a standard, for example according to the standard IEC 60309 or according to IEC 62196 (corresponds to DIN EN 62196) or according to a CENELEC standard for charging plugs or sockets.

The DC voltage connection and possibly the AC connection have resistive contacts. Instead of or in combination with a cable-based interface, an inductive interface may be provided. This inductive interface may include a (vehicle-side) secondary coil of an inductive charging apparatus. The inductive interface may be connected to the AC connection or may be connected to the DC voltage connection via its own inverter and/or rectifier. The secondary coil may be provided inside a resonant circuit, that is to say may be connected to a capacitor in order to form the resonant circuit. A smoothing capacitor may be connected downstream of the secondary coil (generally: coil for inductive energy transmission) in order to generate DC voltage, for example, if it is connected to the DC voltage connection. If both resistive contacts (of the electrical clutch) in the sense of a resistive interface and an inductive interface are provided, the DC voltage connection or the AC connection (preferably together) include a (common) changeover switch (corresponding to a selection circuit) or a combination circuit for combining the two interfaces in order to connect the two interfaces selectably or together to a linking point which is explained in more detail below. In some examples, an automatic charging system disconnects the relevant connection (DC voltage connection, AC connection; connection of the cable-based interface, connection of the secondary coil) if a voltage is not applied to the relevant connection, or which connects the live connections.

The (resistive) DC voltage connection may be designed for an operating voltage of more than 60 V and, for example, up to 600 V, 800 V or 1200 V. Alternatively, the DC voltage connection may also be set up for nominal voltages of 12 V, 24 V or 48 V.

In some implementations, the power circuit includes an electrical machine, such as an electrical traction drive, a starter/generator, an electrical machine of an (air-conditioning or charging) compressor or at least one connection which is set up for connection to an electrical machine.

One aspect of the disclosure provides for the electrical machine to correspond to a traction drive. The latter is connected in a force-transmitting manner to the wheels of the vehicle. The traction drive is used for traction of the vehicle either alone or in combination with at least one further drive assembly, for example an internal combustion engine. The traction drive includes the electrical machine which is possibly set up to also be operated as a generator, for instance in order to recuperate kinetic energy of the vehicle. It may be a separately excited (or possibly also a permanently excited) DC motor, a synchronous machine (three-phase synchronous machine or single-phase synchronous machine) or else an asynchronous machine. However, a separately excited synchronous machine, such as a separately excited three-phase synchronous machine, may be used.

The traction drive or generally the electrical machine may be designed for an operating voltage of more than 60 V, for example, of up to 350 V, 400 V, 600 V, 800 V or 1200 V. Alternatively, the traction drive may be designed for nominal voltages of 12 V, 14 V, 24 V, 36 V, 42 V or 48 V.

As mentioned, the power circuit may also be equipped with a DC/AC converter, such as an inverter, which is connected, for instance, to the traction drive (or to another electrical machine), such as to the stator phases of the traction drive or the electrical machine. The inverter or DC/AC converter may be a traction inverter or may be an inverter of an engine (for instance an internal combustion engine starter or a starter/generator of an internal combustion engine) or the inverter of a compressor (for instance an air-conditioning compressor or a compressor of an internal combustion engine charging apparatus). The inverter may be in the form of a PFC (Power Factor Correction) inverter or a B6C inverter. In some examples, the inverter is a multi-phase and includes semiconductor switching devices. These may be connected, for instance, as a B2 bridge or a B6C bridge (generally: BnC with n=2*number of phases) or an H bridge. Switching elements of the inverter may be in the form of IGBTs, for example with parallel diodes, or MOSFETs. In some examples, the disclosure provides for SiC power semiconductor switches to be used. As a result, the inverter can also be used to produce alternating currents for exciting a coil for the purpose of inductive transmission. The semiconductor switching devices may be designed for a switching frequency of up to 20 kHz, the maximum switching frequency of the semiconductor switching devices (for instance in the case of MOSFETs) may for example, be up to 100 kHz or up to 200 kHz. In some examples, the DC/AC converter (or the inverter) and its AC side are either connected directly to the traction drive or generally to a downstream electrical machine or an AC connection. Alternatively, in some examples, a selection circuit selectably connects the inverter (in particular its AC voltage side) to an electrical machine, an internal AC voltage connection, an external AC voltage connection and/or a coil for inductive energy transmission (or a corresponding coil connection). The inverter and its AC voltage side may therefore be connected to the traction drive or generally to an electrical machine via a so-called selection circuit, the selection circuit being able to connect the inverter (or its AC side) in a selected manner to the traction drive (generally: electrical machine), to the resistive interface, to the inductive interface (in particular the coil or its coil connection) and/or to a vehicle-side mains socket (in the sense of the internal AC voltage connection) as an internal interface (that is to say for components inside the vehicle). The resistive interface and the inductive interface may be considered to be an external interface. According to a first configuration, the selection circuit in this case only ever connects the AC/DC converter (for examples, its AC side) to one of these components (traction drive or generally electrical machine, inductive interface, resistive interface, vehicle-side mains socket). In some implementations, the selection circuit connects the inverter to one or more of the components. In this implementation, the disclosure provides for the selection circuit to connect the inverter either to the traction drive (or generally to an electrical machine) or to one or more of that (internal or external) interfaces. This selection circuit, which allows multiplexing with regard to the use of the inverter, can be used to transmit an AC signal: (i) for operating the traction drive (generally: an electrical machine); (ii) for (bidirectionally) exchanging energy between a vehicle-side electrical energy store and an AC supply network/island network via an AC voltage connection; or (iii) for feeding power from a vehicle-side electrical energy store into a DC supply network (island network) via the inductive or resistive interface, in a produced and selected form.

As a result, the traction inverter is provided with further functions that are implemented using given components. The vehicle-side mains socket is configured like mains sockets for connecting electrical devices to the lowermost distribution level of a low-voltage network of a public power supply system, for instance according to the NEMA or CEE standards. The vehicle-side mains socket is single-phase, but may also be multi-phase (three-phase).

The traction inverter may be designed for an operating voltage of more than 60 V and, for example, of up to 350 V, 400 V, 600 V, 800 V or 1200 V. The traction inverter may instead also be designed for an operating voltage of 12 V, 14 V, 24 V, 36 V, 42 V or 48 V. The traction inverter is bidirectional and can therefore transmit both power from the AC side to a DC side of the traction inverter and power in the opposite direction.

In some implementations, the power circuit includes a DC/DC converter having two converter sides. The DC/DC converter may be bidirectional. The converter sides may be high-voltage converter sides. "High-voltage" means a design of the relevant components for operating voltages of more than 60 V and, for example, of up to 350, 400, 600, 800 V or 1200 V. However, the converter sides may also be designed for operating voltages of 12 V, 14 V, 24 V, 36 V, 42 V or 48 V. The first of the two converter sides is connected to a DC voltage side of the traction inverter via a linking point (of the power circuit). The linking point is provided in a preferably two-conductor connection between the traction inverter (DC voltage side) and the first converter side of the DC/DC converter. The two-conductor connection may be designed as a high-voltage connection, for example, for an operating voltage of more than 60 V or 200 V and, such as, of up to 400 V, 600 V, 800 V or 1200 V. Alternatively, the two-conductor connection may be designed for an operating voltage of 12 V, 14 V, 24 V, 36 V, 42 V or 48 V. The DC voltage connection may be connected to this connection or to the linking point. As a result, DC voltage power may be directly fed into the DC/DC converter from the outside without conversion to be able to be used, for example, to charge a vehicle-side electrical energy store. In the same manner, recuperation power of the traction drive (in the generator mode) can be passed through the traction inverter to the DC/DC converter which can forward the power, as DC voltage, to an electrical energy store in order to charge the latter. Therefore, there is no need for any external charging devices during charging with direct current since the converter already used to transmit recuperation power can likewise undertake this function. However, this does not exclude the use of an additional charging device. If the DC/DC converter is bidirectional, its components may be used to implement further functions, as is described in more detail in the course of this description.

In some implementations, the power circuit has an energy store connection. The second converter side of the DC/DC converter is connected to the energy store connection (for example, directly). The energy store connection is set up to be connected to a vehicle-side electrical energy store. In some examples, the energy store is a high-voltage energy store, for instance a high-voltage traction battery (or else a capacitor bank or else a combination of a capacitor bank and a traction battery) which is in the vehicle. Instead of an energy store connection, the power circuit may also include the energy store itself which is connected to the second converter side of the DC/DC converter.

In some implementations, the power circuit provides for the DC/DC converter to be set up to transmit energy in a bidirectional manner between the two converter sides, that is to say between the first converter side and the second converter side. The DC/DC converter is may be in the form of a synchronous converter. As a result, the power circuit is able to either remove or supply power from/to the energy store via the DC/DC converter. The energy store may be charged via the DC/DC converter and via the DC voltage connection (inductive, resistive or both interfaces) and via the traction inverter (for instance during recuperation). Energy may be removed from the energy store via the DC/DC converter in order to supply this energy to the traction drive or to the DC voltage connection or to the AC voltage connection already mentioned. Stationary DC or AC supply networks or island networks may obtain energy from the vehicle-side energy store via the DC voltage connection or the AC voltage connection. The same components of the DC/DC converter are used for these functions, as a result of which components can be saved, for example, on the stationary side (or else on the vehicle side), in comparison with known circuits.

In some examples, the power circuit has an AC voltage connection, for example for a public power supply system (e.g., the lowermost distribution level of a low-voltage network of a public power supply system), for example, the AC voltage connection already mentioned. The latter is connected to the AC side (that is to say the AC voltage side) of the DC/AC converter. In some examples, the AC voltage connection is designed according to a standard, for instance according to the standard IEC 60309 or according to IEC 62196 (corresponds to DIN EN 62196) or according to a CENELEC standard for charging plugs or sockets. This AC voltage connection (also called AC connection) may be connected to the AC voltage side of the DC/AC converter via a selection switch. An EMC filter and/or at least one (serial) isolating switch may also be provided between the AC voltage connection and the DC/AC converter.

In some implementations, another possibility is to equip the DC voltage connection, possibly the AC voltage connection and/or the battery connection with an isolating switch (as noted above). In some examples, instead of or in combination with the isolating switch, it may be possible to use an overload safety device in to protect the connections.

The DC voltage connection and the AC voltage connection may be integrated in a common electrical connection component. In this case, the DC voltage connection and the AC voltage connection may be designed as contacts of a common plug connection component. This plug connection component is designed according to a standard, for instance according to the standard IEC 60309 or according to IEC 62196 (corresponds to DIN EN 62196) or according to a CENELEC standard for charging plugs or sockets.

Furthermore, the traction inverter, the DC/DC converter or both of these components may be designed to generate a controllably variable DC voltage at the linking point. This makes it possible to set the output voltage of the DC/DC converter or the traction inverter, such that it is possible to carry out a comparison with the voltage level at the DC voltage connection, for instance if the voltage level at the DC voltage connection is predefined by a supply network/island network connected there and that at the DC voltage connection needs to be adapted thereto. The control device already mentioned may be connected to the traction inverter or to the DC/DC converter in a controlling manner such that the control device may set the DC voltage on the first converter side of the DC/DC converter or on the DC side of the traction inverter. As already noted, the traction inverter may be bidirectional, for example, to be able to operate the traction drive connected thereto as a motor and as a generator and to be able to transmit power in the two opposite directions.

Furthermore, the power circuit or the traction inverter may be equipped with a power detection device. The power detection device is set up to respectively determine the energy (or else power) which flows through the traction inverter for both flow directions. The power detection device may be connected to the control device, for example in order to receive one or more signals representing the determined energy or power. Furthermore, the DC/DC converter may be alternatively or additionally configured with such a power detection device. The power detection device may be provided with a communication interface which can communicate, for instance, with a charging station, which is connected via the DC voltage connection or the AC connection, for instance for the purpose of billing costs, identifying the driver and/or vehicle or transmitting the (charged and/or discharged) energy detected by the power detection device. In the same manner, the power detection device may be used to detect the energy transmitted to the DC voltage connection or to the AC connection. Furthermore, instead of or in combination with the energy, the power may be transmitted (as a value), such as to control the energy flow, such as for an upper limit.

After the practice of using the linking point or the connection between a vehicle-side DC/DC converter and an inverter to directly connect a DC connection (for connecting stationary devices) to this linking point has been described, the complementary embodiment is described below. In both examples, the possibility of direct supply or tapping directly from the DC/DC converter and, at the same time, directly from the inverter (that is to say at the linking point) makes it possible for numerous components to be reused for different functions.

A stationary energy supply system is therefore described. This system has a DC line, an electrical energy source (which is may be regenerative, for instance a photovoltaic installation), an energy source DC/DC converter which connects the energy source to the DC line and is bidirectional such as, an inverter which is connected to the DC line, and a DC voltage connection.

In this case, the DC voltage connection is set up to connect an electrically driven vehicle. The DC voltage connection may be in the form of a plug connection component and may correspond to a standard, such as the standard IEC 60309 or IEC 62196 (corresponds to DIN EN 62196) or to a CENELEC standard for charging plugs or sockets. The DC voltage connection of the stationary energy supply system is complementary to the DC voltage connection of the power circuit; for example, both can be connected to one another in a disconnectable manner. In some examples, a data interface is integrated in the DC voltage connection or which is designed as a radio interface, for instance a short-range radio interface (WLAN, Bluetooth, etc.), or which is designed as a car-to-X communication interface (for instance IEEE 802.11p). The data interface may be configured in accordance with a standard according to IEEE 802.11. The data interface is provided for the purpose of transmitting operating parameters such as maximum charging current, state of charge, charging time and others. The DC voltage connection of the stationary energy supply system may be directly connected to the DC line. The DC voltage connection may also be directly connected to an electrical energy source (for instance a stationary battery or a fuel cell). This electrical energy source may have a data interface which is designed like the data interface described above.

The inverter operates as a bidirectional inverter. In some examples, the inverter of the stationary energy supply system operates as a bidirectional inverter. The inverter has an AC side that is set up to be connected to a supply network. The inverter has a DC side that is connected to the DC line.

The DC line may have a high-voltage nominal operating voltage, that is to say a nominal operating voltage of at least 60 V and up to 220 V, 350 V, 400 V, 600 V or 800 V. Alternatively, the DC line may have a nominal operating voltage of 12 V, 14 V, 24 V, 36 V, 42 V or 48 V. The components connected to the DC line are provided with a corresponding nominal operating voltage.

The DC line forms a stationary DC intermediate circuit to which the inverter (for connecting an AC supply network) is connected and to which an island network (for example, a photovoltaic installation) can be connected. Therefore, the island network is likewise connected to the general AC supply network via the inverter. The direct connection to a vehicle having an electrical traction drive (that is to say having a high-voltage energy store) is provided via the DC voltage connection of the stationary energy supply system. The energy source DC/DC converter allows an island network with a fluctuating voltage level (or else only an energy source of an island network, for example a photovoltaic installation) to be connected to the DC line.

The stationary energy supply system may have a supply network connection that is directly connected to the inverter (to its DC side). The supply network connection may be connected to an electrical (general) supply network directly or via a network filter. In some examples, the general supply network is not part of the stationary energy supply system, but rather only a supply network connection is provided on the side of the stationary energy supply system which can be connected to the general supply network.

In some implementations, the stationary energy supply system may also have an AC voltage connection that is complementary to the AC voltage connection of the power circuit described above. Both AC voltage connections may be connected to one another in a disconnectable manner. The AC voltage connection of the stationary energy supply system is set up to connect an electrically driven vehicle, via the AC voltage connection of the power circuit. The AC voltage connection of the stationary energy supply system is connected to the AC supply network, for example, via isolating switches and/or fuses. The AC voltage connection may be connected to the supply network connection.

The stationary energy supply system may also have a stationary electrical energy store. Furthermore, the stationary energy supply system may have a store DC/DC converter. This converter may be bidirectional. The store DC/DC converter connects the stationary electrical energy store to the DC line.

Instead of or in combination with the island network, it is possible to provide fuel cells (or other DC voltage sources) which are connected to the DC line via their own DC/DC converter.

In a complementary manner to this, the power circuit may include a further DC/DC converter and a DC voltage source connected to the latter, such as a second battery, the further DC/DC converter connecting the DC voltage source to the linking point. A range extender (with a rectifier) may also be provided as a DC voltage source. In addition, it is possible to provide a range extender, the generator of which is directly connected to the AC connection or to the AC side of the inverter.

The DC/DC converters of the stationary energy supply system that are described here have two high-voltage DC sides.

In some examples, the inverters and/or converters described here are designed for powers of at least 5 kW, for example, of at least 10, 20, 30, 50, 70 or 100 kW. The power may be less than 500 kW, for example, less than 200 kW or no more than 100 kW.

The inverter of the stationary energy supply system and its AC side may be multi-phase, for example, for connection to a three-phase system. The AC voltage connection of the stationary energy supply system may likewise be multi-phase, for example, for connection to a three-phase system. A network filter may be situated between the inverter of the stationary energy supply system and the supply network connection, preferably a multi-phase (for instance three-phase) network filter.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
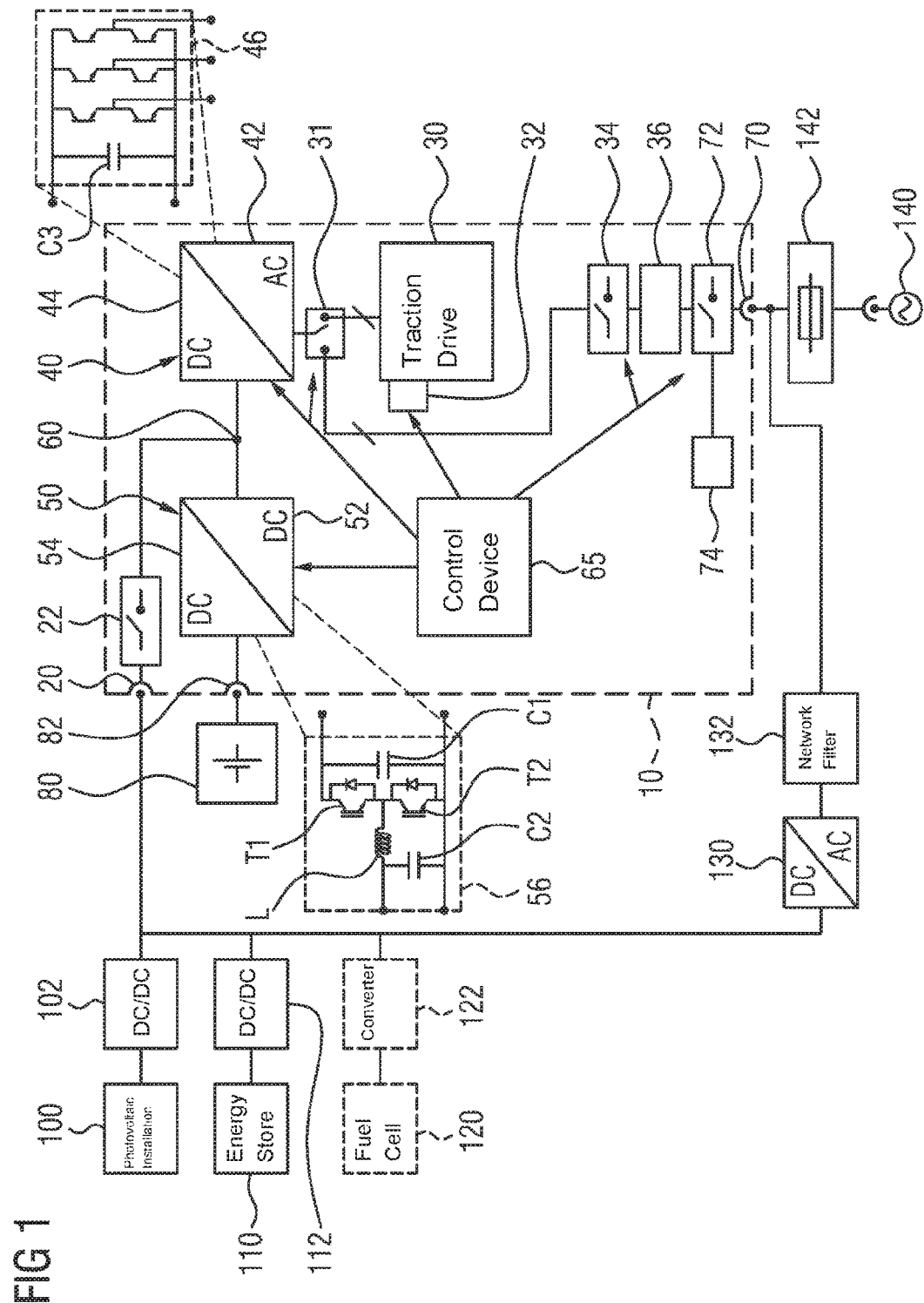
FIG. 1 shows an exemplary power circuit.

FIG. 1 illustrates a power circuit 10 that includes a DC voltage connection 20, an electrical traction drive 30 (as a placeholder for the generally mentioned electrical machine), an inverter 40 and a DC/DC converter 50. The DC/AC converter or inverter 40 (referred to as a traction inverter below on account of the example selected in FIG. 1) has an AC voltage side 42, which can also be referred to as an AC side, and a DC voltage side 44, which can be referred to as a DC side. The DC/DC converter 50 has two high-voltage converter sides 52, 54, a first converter side 52 of these high-voltage converter sides being connected in a power-transmitting manner to the DC voltage side 44 of the traction inverter 40. The connection between the first converter side 52 of the DC/DC converter 50 and the DC voltage side 44 of the traction inverter 40 has a linking point 60 to which the DC voltage connection 20 is connected (via an optional DC isolating switch 22). In other words, the DC voltage connection 20 is connected in a power-transmitting manner to the first converter side 52 of the DC/DC converter 50 and to the DC voltage side 44 of the traction inverter 40. The connection or the linking point can be considered to be an intermediate circuit between the traction inverter 40 and the DC/DC converter 50, to which the DC voltage connection 20 is connected. Both sides of the DC/DC converter 50 operate in the high-voltage range with the operating voltages which were mentioned at the outset and are linked to the prefix "high-voltage", but operating voltages (as mentioned at the outset) outside the high-voltage range are also conceivable.

The traction inverter (generally: the DC/AC converter) and the DC/DC converter are bidirectional. A detailed illustration 56 of the DC/DC converter shows its basic structure with a first smoothing capacitor C1 and a semiconductor switch having two transistors that are in the form of n-MOSFETs, in particular, in which case implementations as SiC power semiconductors or IGBTs are also possible. Reference is also made to the illustrated substrate diodes of the transistors and to their forward directions that point to the positive potential. Instead of n-MOSFETs, it is also possible to use IGBTs (as illustrated) as semiconductor switches. The semiconductor switches are connected in series. An inductance is connected in series with the common linking point resulting from this connection, a second smoothing capacitor C2 being connected on the opposite side (to the semiconductor switches). The first converter side 52 of the DC/DC converter 50 (or the connections of the first converter side) is (are) formed by the connections of the first smoothing capacitor C1. The second converter side 54 of the DC/DC converter 50 (or the connections of the second converter side) is (are) formed by the connections of the second smoothing capacitor C2. The smoothing capacitors are each connected as a parallel capacitor. The result is a synchronous converter. The connections or the converter sides of the DC/DC converter 50 are provided for two voltage potentials (positive pole/negative pole or positive pole/ground).

A detailed illustration 46 of the traction inverter 40 (generally: the DC/AC converter) shows a B6C bridge having a smoothing capacitor C3 which is connected in parallel and is situated on the DC side 44 (or at the connections of the DC side) of the traction inverter 40. Starting from the smoothing capacitor C3, semiconductor switches that can be controlled toward the AC side are provided in three individual phases in a bridge circuit (that is to say in a so-called B6C circuit). Two semiconductor switches that are connected in series are provided for each of the three phases, at the linking point of which semiconductor switches the individual phase conductors of the AC side branch off. The AC side 42 (or its connections) is (are) therefore three-phase. The traction inverter 40 is bidirectional. The semiconductor switches of the traction inverter 40 may be in the form of IGBTs, SiC power semiconductors or n-MOSFETs. In particular, the semiconductor switches may each be provided with a diode that is reverse-connected in parallel and connects the connections to be switched. The diodes have a forward direction that points to the positive pole (of the DC side 44). When using SiC power semiconductors inside the traction inverter 40 (generally: the DC/AC converter), the latter may also be used to generate a current for inductive charging on account of the high (maximum) switching frequencies of the inverters 40, the frequency of which current can be in the range of 100 kHz or higher.

The power circuit 10 may have a control device 65 that controls the DC/DC converter and the traction inverter and, in particular, their semiconductor switches.

Isolating switches 34 are also provided at the traction drive 30 and, like the isolating switches 72 provided at an alternative fitted position, can disconnect the electrical machine from the AC connection 70. A selection switch 31 is connected downstream of the DC/AC converter 40 or its AC side. The common connection of the selection switch 31, which can be optionally connected to one (or else more) individual connections of the selection switch 31, is connected to the DC/AC converter 40 or its AC side 42. One of the individual connections that can be connected in a controlled manner to the common connection of the selection switch is connected to the electrical machine 30. A further of the individual connections is connected to the AC connection 70, for example, via the isolating switch 34 and/or the isolating switch 72, and also via the EMC filter 36. The selection switch, the relevant connections, the isolating switch(es) and the EMC switch are single-phase or multi-phase.

An AC voltage connection 70 that is connected to the EMC filter 36 or (indirectly) to the traction drive 30 via the serial isolating switch 72 is situated on that side of the EMC filter 36 which is remote from the traction drive 30. An individual isolating switch is connected in series in each phase. If the isolating switches 72 are open, the capacitor bank 36 or the traction drive 30 is disconnected from the AC connection 70. If the isolating switches 72 are closed, the capacitor bank or (indirectly) the traction drive 30 is connected to the AC connection 70.

The isolating switch 34 is connected between the capacitor bank 36 and the electrical machine and forms an alternative to the isolating switch 72 that is connected between the capacitor bank 36 and the AC connection 70. Both positions (34 and 72) are therefore illustrated for the switches with the same function ("isolating switches").

The isolating switch 72, which can be assigned to the AC voltage connection 70, and the alternative isolating switch 34 are used to interrupt the phases or the connection between the electrical machine 30 and the AC voltage connection 70. The isolating switch 34 and the isolating switch 72 are situated inside the vehicle, with the result that the power circuit can protect itself from external influences by actuating the isolating switch.

For this purpose, the control device 65 may record operating parameters such as the current intensity of the current flowing through a component of the power circuit or the temperature of one of these components and can activate the isolating switch if a predefined limit value is exceeded. The isolating switch 34 and the isolating switch 72 may be referred to as AC voltage decoupling switches in order to describe their function in more detail. The control device 65 may be connected in a controlling manner to the isolating switches 34 and 72.

The arrows illustrated show the controlling connection of the control device 65 with respect to the relevant components and represent control signal transmission. For example, the controlled connection between the control device 65, on the one hand, and the isolating switch 72, the isolating switch 34 and the selection switch 31 is illustrated.

The illustrated solid lines (without further marking) represent power-transmitting DC voltage connections that are in the form of a two-conductor system. The illustrated solid lines that are marked with an oblique represent power-transmitting AC voltage connections which are three-phase, for example. This also applies to FIG. 2. The dotted line in FIG. 1 indicates the affiliation of components to the power circuit.

A traction battery 80 optionally belonging to the power circuit 10 is connected to the power circuit 10 via an electrical energy store connection 82 of the latter. The energy store connection 82 is connected to the second converter side 54 (at the high-voltage level) of the DC/DC converter 50. A vehicle-side mains socket 74 can be connected downstream of the isolating switch 72 and generally the DC/AC converter or inverter 40 (or its AC voltage side 42). In this case, the DC/AC converter 40 may be used as an inverter for producing an AC voltage (for instance 110 or 230 V at 50 or 60 Hz) which is conventional for public supply networks. A selection switching apparatus may be provided between the isolating switch 72, on the one hand, and the external connection (AC voltage connection 70) and/or the internal connection (vehicle-side mains socket 74). Such a selection switching apparatus may be implemented by the selection switch 31 but may also be provided by a further selection switch (not illustrated) between the EMC filter 36 and the AC connection 70. In this case, the further selection switch (not illustrated) may be provided at the location of the isolating switch 72 or may be implemented together with the latter. Such a selection switching apparatus may be connected to the control device 65 in a controlling manner. The further selection switch may generally be provided between the AC voltage side 42 of the traction inverter 40, on the one hand, and the connections 70 or 74, on the other hand.

Fuses and/or network filters may be provided between the traction inverter 40 and the connections 70 or 74, for example between the selection circuit (see, for instance, the selection apparatus or selection switch 31 above) and the traction inverter 40 or between the selection circuit and the connections (that is to say the mains socket or the AC voltage connection 70).

A vehicle-side coil of an inductive coupling device or a connection for the latter may also be provided. The coil or the associated connection may be directly or indirectly connected downstream of the AC voltage side 42. The coil or its connection may also be connected to the DC connection 82 or to the linking point 60 via an additional (for example, bidirectional) inverter which is used to produce the coil current.

The following possible power flows result from the topology:

from the DC voltage connection 20, via the DC/DC converter 50, to the energy store connection 82 (charging of the vehicle-side energy store, DC voltage);

from the energy store connection 82, via the DC/DC converter 50, to the DC voltage connection 20 (support for an external supply network from the vehicle-side energy store);

from the energy store connection 82, via the DC/DC converter 50 and the traction inverter 40, to the mains socket 74 or to a coil which is connected downstream of the traction inverter 40 and is intended to inductively transmit energy (or to its connection); and from the DC voltage connection 20, via the DC/DC converter 50 and the inverter 40, to the AC voltage connection 70 (or to the mains socket 74 or to a coil connected downstream of the traction inverter 40). In this application, the power circuit is used as a "mobile inverter", for instance in order to feed DC voltage from a photovoltaic installation into a public network (or a local AC network).

The control device 65 is set up to control the components, which are controlled by it, according to at least one of these power flows and preferably according to all of these power flows.

Further applications are possible, for examples, the situations mentioned in the further course of this description, for instance parallel AC and DC charging. The external energy store may also be the electrical energy store of a further vehicle, with the result that the last-mentioned situation concerns the transmission of energy from one vehicle to another vehicle.

The power circuit 10 is may be set up to record operating parameters such as the applied type of voltage and/or voltage level in order to configure at least one component of the power circuit according to one of the applications or power flows mentioned herein. In some examples, this is carried out automatically, that is to say without a user input. In the case a plurality of possible applications or power flows, the power circuit may be set up to display the possible configurations (or applications or power flows) on a user interface and to detect a possibility selected by the user.

The power circuit is set up, for example, to record the above-mentioned operating parameters at the connections, for example at the external connections such as the DC voltage connection 20, the AC voltage connection 70, the energy store connection 82 and/or a connection for connecting a coil for inductive energy transmission. It is possible to determine, for example, whether voltage is applied to the relevant connections. Alternatively or in combination with this, the power circuit 10 may be set up to record the operating parameters inside the power circuit 10, for example, the voltage at the linking point 60, on one side (side 42 and/or 44) of the traction inverter 40 or at the EMC filter 36. For this purpose, the power circuit 10 may have a voltage detection unit. The latter may be coupled to the control device 65 or may be part of this control device 65.

As previously mentioned, the power circuit 10 may have a selection circuit, for example, a selection circuit between a plurality of connections that are connected to the DC voltage connection 20 via the selection circuit. These connections are, for example, the resistive interface and the inductive interface. Alternatively or in combination with this, a selection circuit may be provided between a plurality of connections and the AC connection 70. The last-mentioned connections are, for example, a connection to an AC voltage supply network 140, the vehicle-side mains socket 74 and/or a connection to a coil for inductive energy transmission. The control device 65 is set up to set this selection circuit or these selection circuits according to one of the power flows, applications or configurations. In some examples, the control device is set up to control the isolating switch 34 connected to the traction drive 30.

In some implementations, the control device 65 is set up to set the frequency, the voltage and/or the current of components of the power circuit 10 according to the application or configuration to be set or according to the energy flow to be set. If, for instance, the vehicle-side mains socket 74 is connected, the frequency and the voltage of the traction inverter 40 are set according to the frequency (for example 50 or 60 Hz) and the voltage of a public supply network 140. If a coil intended for inductive energy transmission is connected to the traction inverter 40, a frequency corresponding to the desired alternating field of the coil is selected, this being able to be in the range of several kilohertz, for example, in a range above 50 or 70 kHz.

The control device 65 is also set up to set the voltage at the linking point 60 and/or at the energy store connection 82. In other words, the control device 65 is set up, for example, to set the voltage on at least one side of the DC/AC converter 40 and/or the DC/DC converter 50 or the current flowing there.

The combination of a state of the selection circuit(s) that is to be set and operating parameters to be set (for instance voltage, frequency or current) may be referred to as a desired operating mode. This corresponds to the application or the energy flow to be set and may also be equated with the configuration.

In some implementations, the power circuit 10 is equipped with the selection circuit. The selection circuit has a voltage detection unit, for example, the voltage detection unit described above. The voltage detection unit is connected to at least two of the following components: the traction drive 30, the AC voltage connection 70, the DC voltage connection 20, the energy store connection 82 and the coil for inductive energy transmission. The voltage detection unit is also set up to detect whether a voltage is applied to the relevant component to set the selection circuit, a frequency of the traction inverter 40 and/or a voltage of the traction inverter 40 according to a possible operating mode or a predefined desired operating mode.

Components for explaining applications are also illustrated in FIG. 1. A stationary DC voltage supply network (connectable to a general supply network or as an island solution) includes a photovoltaic installation 100 having a DC/DC converter 102 connected thereto and a stationary energy store 110 with a DC/DC converter 112 connected thereto. The stationary DC voltage supply network includes a stationary DC line (DC voltage network) to which the photovoltaic installation 100 and the stationary energy store 110 are connected via the converters 102, 112 respectively connected thereto. Further loads or energy sources may be connected, for instance a fuel cell 120 that is connected to the DC line via its own converter 122 connected thereto. The photovoltaic installation 100, the stationary energy store 110 and/or the fuel cell 120 can be connected to the DC voltage connection 20 of the power circuit 10, for example, for the purpose of bidirectional power exchange or else only for the purpose of transmitting power to the power circuit 10.

The DC voltage supply network may also be connected to a general AC voltage supply network via a (bidirectional, for example) stationary DC/AC converter 130 (and a downstream network filter 132). The connection to the AC voltage supply network 140 may be protected via overload safety devices 142. The components 100, 110 and/or 120 of the DC voltage supply network may be connected to the AC voltage supply network 140 via the DC/AC converter 130, for instance in order to feed energy into the AC voltage supply network 140 or to receive energy from the AC voltage supply network 140 (this concerns the stationary energy store 110 or else the fuel cell 120 which then operates as an electrolyzer). The vehicle-side AC voltage connection 70 may be connected to the stationary DC/AC converter (via the network filter 132 which is optional in this case) or may be connected to the general AC voltage supply network 140 (via the overload safety devices 142). This makes it possible to transmit energy between the stationary DC voltage network (island network) or the general AC voltage supply network 140, on the one hand, and the vehicle-side power circuit 10. This energy transmission may be bidirectional or may be unidirectional in any of the directions.

In some examples, power can be simultaneously transmitted to the power circuit via the AC voltage connection 70 and via the DC voltage connection 20, for charging the electrical energy store 80. This application may also be referred to as parallel AC and DC charging. This enables considerably shorter charging times. Furthermore, in some examples, it may be possible to use a plurality of energy sources at the same time to charge the energy store, such as a public supply network and, at the same time, a local power plant, such as a photovoltaic installation. This application also illustrates the savings potential provided by the disclosure since the traction inverter 40, which is (also) used to produce the rotary field in the drive 30, is used for another function in this case, namely the AC/DC conversion, and to control the energy flow from the AC connection 70 in the direction of the energy store 80. The saving in power components as a result of this repeated use is considerable due to the high costs of power semiconductors.

The power circuit 10 may also receive power from the general stationary AC voltage network 140 via the AC voltage connection 70 and may output power to the stationary DC voltage network (for example, to the fuel cell 120 and/or to the stationary energy store 110) via the traction inverter 40 and the DC/DC converter 50 at the DC voltage connection 20. As a result, the DC/AC converter 130 may be relieved or supported when receiving power from the AC voltage network 140. For example, it may be dimensioned with lower power (in comparison with the situation in which the power circuit is not used) since the vehicle or the power circuit 10 is usually mostly available if the fuel cell 120 or the stationary energy store 110 is charged (with off-peak electricity or at a favorable tariff).

Figure 2:
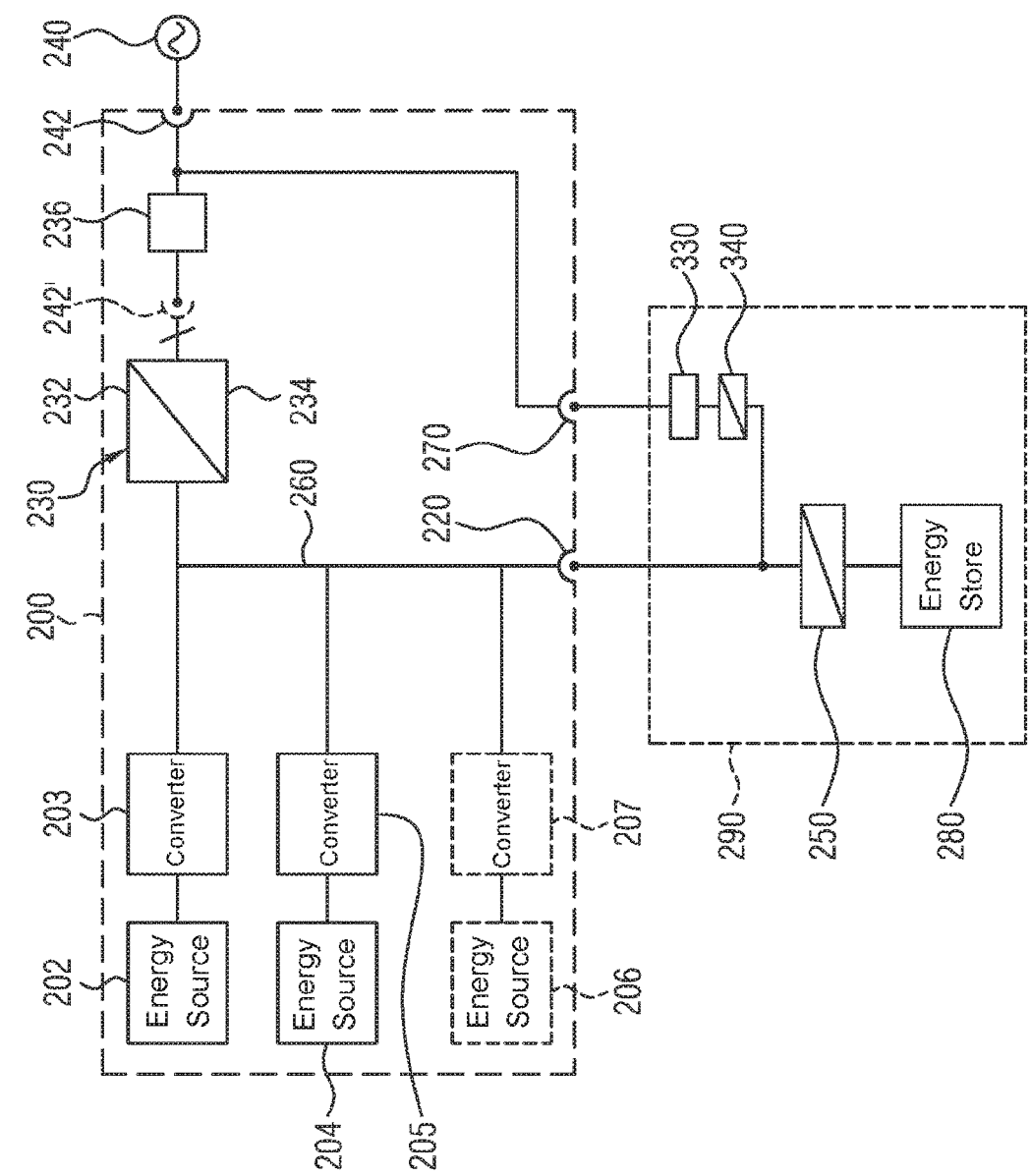
FIG. 2 shows an exemplary stationary energy supply system.

FIG. 2 shows a stationary energy supply system 200 having a DC line 260, at least one electrical energy source 202, 204, 206 and at least one energy source DC/DC converter 203, 205, 207 which connects the relevant energy source 202, 204, 206 to the DC line 260 (DC supply network, island network). Each electrical energy source 202, 204, 206 is connected to the DC line 260 via one of the energy source DC/DC converters 203, 205, 207. (In some examples (not shown), the electrical energy sources may be directly connected to the DC line without a converter). The energy source 202 may be a photovoltaic installation, the energy source 204 may be a fuel cell, and the energy source 206 may be a stationary electrical energy store. The converters 203, 205 and 207 may be unidirectional (energy flow from the energy source to the DC line 260), for instance in the case of the converter 203, or may be bidirectional, for instance in the case of the converters 205 and 207. Bidirectional energy source DC/DC converters are used if the energy source which is connected to the DC line 260 by the relevant converter is also configured to receive energy, for example, in the case of the electrical energy store 206 which is in the form of a stationary rechargeable battery, or in the case of the fuel cell 204. The energy source DC/DC converters are used to couple an energy source to the DC line 260 and therefore have the prefix "energy source".

The stationary energy supply system 200 also has an inverter 230, the DC side 232 of which is connected to the DC line 260, and a DC voltage connection 220 and an AC voltage connection 270. The AC voltage connection 270 is connected to an AC side 234 of the inverter 230. The inverter 230 is, for example, a bidirectional DC/AC converter. The AC side 234 and the AC voltage connection 270 are multiphase, for example, three-phase. The AC voltage connection 270 is used to connect a vehicle.

The DC voltage connection 220 is set up to connect an electrically driven vehicle 290. As such, the connection 270 and the connection 220 have identical properties and may possibly be combined in one connection, for instance in the form of a socket according to a CCS plug-in charging system according to IEC 62196. The DC voltage connection 220 is directly connected to the DC power bus of the vehicle (possibly via overload safety devices, filters or serial isolating switches).

The AC voltage connection 270 is likewise set up to connect an electrically driven vehicle 290 and is connected to the DC line 260 via the inverter 230. As an alternative or in addition to the DC voltage connection 220, a vehicle may also be connected via the AC voltage connection 270. A traction inverter 340 may be connected downstream of the electrical machine on the vehicle side. In this manner, the AC connection is connected to a linking point via the electrical machine 330 and via the (bidirectional) traction inverter 340, to which linking point the (stationary) DC voltage connection 220 and a vehicle-side DC/DC converter 250 are also connected. In this case, the vehicle-side DC/DC converter 250 connects the (stationary) DC voltage connection 220 to a vehicle-side energy store 280.

In some implementations, the DC/DC converter 250 is stationary (and therefore part of the energy supply system) and is connected upstream of the connection 220. An EMC filter may be provided on the vehicle side.

In some examples, alternatively or additionally, the AC voltage connection 270 is connected to a general AC supply network 240 (possibly via isolating switches, filters and/or overload safety devices), 242 being used to denote an electrical supply network building connection for a general AC supply network.

The supply network connection 242 may be connected, for exmaple, to an electrical supply network directly or via a network filter 236. If a network filter 236 is used, the alternative AC voltage connection 242' which leads, via the network filter, (directly) to the AC supply network 240 is connected to the AC connection 270. The network filter 236 is optional; the connections 242 and 242' are interchangeable.

The stationary energy supply system may also have a stationary electrical energy store and a bidirectional store DC/DC converter that connects the stationary electrical energy store to the DC power bus.

The components having the following reference symbols correspond to one another and may have the same properties:

100, 110, 120 ↔ 202, 204, 206
102, 112, 122 ↔ 203, 205, 207
20 ↔ 220
30 ↔ 330
40 ↔ 340
50 ↔ 250
70 ↔ 270
80 ↔ 280

The stationary energy supply system is complementary to the power circuit and is configured for connection to the power circuit.

The components having the following reference symbols correspond to one another in the complementary sense and may have the same properties (apart from their vehicle-side or stationary arrangement):

60 ↔ 260
40 ↔ 230

In some examples, the stationary energy supply system supports the following applications:

energy transmission from the energy source 202 to the supply network 240 (feedback, supply);

energy transmission from the supply network 240 to a (chargeable) energy source 204, 206 (charging, stationary);

energy transmission from a vehicle or its energy store 280, via the DC connection 220, to a (chargeable) stationary energy source 204, 206 (vehicle-side support of stationary network, energy transmission via DC/DC converter 250);

energy transmission from a vehicle, via the DC connection 220 and the inverter 230, to the supply network 240 (vehicle-side feedback to the supply network);

energy transmission from the supply network 240 to the stationary energy source 204, 206 via the AC voltage connection 270, the vehicle-side DC/AC converter 340 and the DC voltage connection 220 (vehicle-side feedback to stationary energy stores/energy sources).

The last-mentioned energy transmission may be carried out at the same time as energy transmission starting from the supply network, via the inverter 230, to the DC line or to the relevant energy sources 204, 206.

Since the energy sources 204, 206 may also receive and store energy, these components may also be referred to as electrical energy stores. The energy stores are general electrostatic (capacitor) or electrochemical (capacitor, fuel cell, rechargeable battery) energy stores or a combination thereof.

Figure 3:
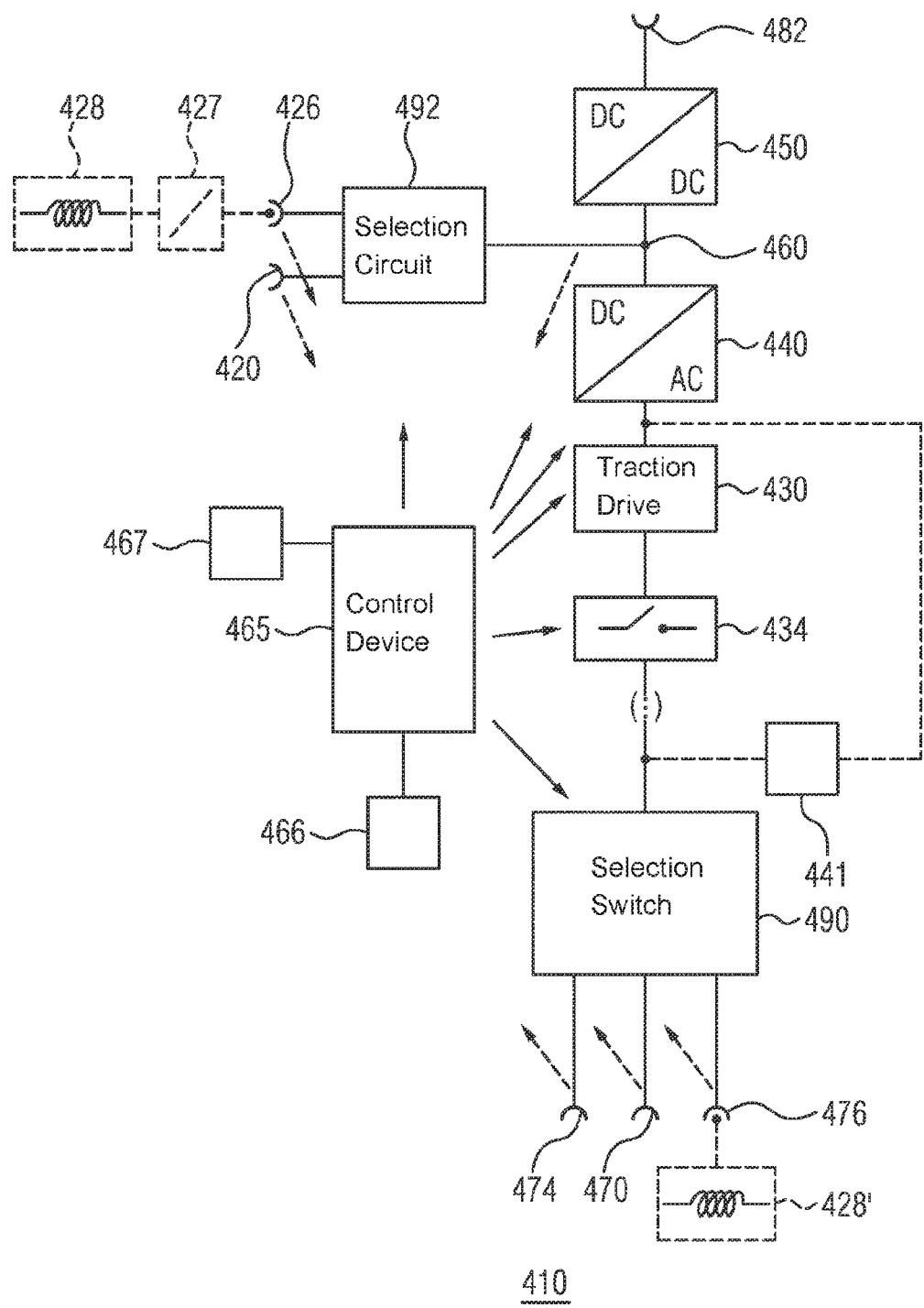
FIG. 3 shows another exemplary power circuit for explaining an automatic configuration.

FIG. 3 shows an exemplary power circuit 410 for explaining the aspect of automatic or semi-automatic configuration. The power circuit 410 is equipped with a DC/AC converter 440 and a DC/DC converter 450 (for example, both bidirectional). A DC side of the DC/AC converter 440 is connected to the DC/DC converter 450, a linking point 460, to which a DC connection 420 is connected (via a selection circuit 492), being provided at this connection. An electrical traction drive 430 (that is to say an electrical machine) is connected downstream of the AC side of the DC/AC converter 440. An (optional) isolating switch 434 is connected downstream of the traction drive 430. A separate network filter 441 (with its own filter inductances) may be provided instead of or in combination with the isolating switch 434, which network filter is connected downstream of the DC/AC converter 440 and connects the latter to the selection switch 490 or to connections 470, 474, 476 (as explained below).

The selection switch 490 is connected between the DC/AC converter 440 and the connections 470, 474, 476. These are used for connection to AC voltage loads or AC voltage sources. The connection 470 corresponds to the AC connection that is provided for connection to a stationary AC voltage network. The connection 474 is in the form of a vehicle-side mains socket. The connection 476 is a connection for connecting a coil 428' for inductive energy transmission. As shown, the coil 428' is not part of the power circuit 410 and is therefore illustrated (as optional) using dashed lines. In other examples, the coil 428' may be part of the power circuit 410.

The selection switch 490 is controlled by a control device 465. A voltage detection unit 466 detects the voltages or voltage potentials at different points of the power circuit 410. As shown in FIG. 3, the detection of the voltages is symbolically illustrated by means of dashed arrows. For example, the voltages at the connections 474, 470 and 476 (for alternating current) and at the connections 426 and 420 (for direct current) are detected. Furthermore, the voltage at the energy store connection 482 may also be detected by the voltage detection unit 466. The voltage detection unit 466 detects whether or not voltage is applied to the connections or detects a voltage value or detects whether a voltage which is above a predefined threshold value is applied. Therefore, the voltage detection unit 466 is able to detect whether or not the relevant connection is occupied. For example, it is possible to detect that a voltage is respectively applied to the connections 420 and 470. The control device can infer therefrom that both connections may be used (at the same time) to transmit electrical energy to the power circuit, for example, to charge an energy store (which can be connected to connection 482). If a voltage is applied only to one of the connections 420, 470, only this connection is used to transmit energy to the power circuit 410. In addition to the voltage, the voltage detection unit may determine, by means of a resistance measurement, whether a non-active element (generally a load) is connected to one of the relevant connections or whether the relevant connection is free. In this case, it is possible to detect, for example, if the connection 476 (or 426) is (directly or indirectly) connected to a coil in order to possibly apply a voltage signal to the relevant connection for the purpose of exciting the coil. Since a resistance measurement can be carried out, for example, by measuring a voltage if a current is applied or, to determine the current, by measuring a voltage at a shunt resistor if a voltage is applied, the voltage detection unit may also be referred to as a voltage detection unit in its function as a resistance measuring unit.

The selection switches 490, 492 are controlled according to the arrows starting from the control device 465. These arrows symbolically represent the path of the control signals. In addition to the selection switches, the control device 465 may also control converting or switching components of the power circuit 410, for instance the DC/DC converter 450, the DC/AC converter 440, the isolating switch 434 and/or the drive 430.

In some examples, the control device 465 controls the components described above automatically or semi-automatically according to predefined programming or a predefined assignment. The programming or assignment links states (voltage/no voltage or infinite or finite resistance), which are determined by the voltage detection unit, to desired switching states of the selection switches 490, 492, desired frequencies of the DC/AC converter 440 and/or desired voltages on the AC side or DC side of the DC/AC converter or at one of the connections. In some examples, if a load is plugged in at the connection 474 for a mains socket, this being able to be detected, for instance, via the finite resistance which can be detected there, the DC/AC converter 440 can be set to produce an AC voltage of 230 V at 50 Hz on the output side. In this case, the control device can form, together with the voltage detection unit 466, a regulating system which regulates the voltage at the relevant connection (here connection 474) to a particular desired value. The control device 465 also controls the selection circuit 490 to connect the DC/AC converter 440 to the connection 474, the isolating switch 434 being able to be controlled with the state "open".

Control by the control device solely on the basis of the detection by the voltage detection unit 466 or without taking into account a user input is referred to as automatic assignment or programming. The control device 465 may display the detected states and/or the desired states (or the associated applications or energy flows) on a user interface 467, for example, as an image from an electronic display. In the case of semi-automatic assignment or programming, the detected states and/or the applications or energy flows possible in this case are displayed. In this case, the user interface 467 detects which of the possibilities is selected, or a confirmation signal is detected. The control device 465 controls the relevant components according to the signal detected by the user interface. In this case, the user interface may be a touch-sensitive screen or a display having buttons or other input devices for detecting the user input.

A coil 428 for inductive energy transmission may be connected to the selection unit 492 at the connection 426, a bidirectional inverter 427 for example, being connected between the coil 428 and the connection. Since the selection unit 492 or the DC side of the inverter 440 connected thereto is designed for DC voltage, but the coil 428 itself is operated with AC voltage or produces the latter, the inverter 427 is needed. In contrast to this, the coil 428' may be directly connected to the selection unit 490 since the selection unit (or the AC voltage side of the DC/AC converter 440 connected thereto) is likewise designed for AC voltage.

The selection units 490, 492 may be in the form of electromechanical switching units or, for example, in the form of electronic switching units. In some examples, the selection units 490, 492 have a plurality of switches that connect the linking point 460 or the AC side of the DC/AC converter 440 to the relevant connections 420, 426 or 470, 474, 476 in a freely selectable manner. A plurality of connections may be simultaneously connected by one of the selection units or the selection units are in the form of changeover switches in which only one connection is ever connected.

The components in FIG. 3 and FIG. 1 having the following reference symbols correspond to one another, corresponding components being able to have the same properties:

30↔430
40↔440
50↔450
60↔460
65↔465

The AC connection 70 in FIG. 1 is the only connection that leads (indirectly) to the traction drive 30. Since the selection switch 490 is provided in FIG. 3, the connection 470 provided for connection to a supply network is positioned on an external side of the selection switch 490. Apart from the interposition of the selection switch, the AC voltage connection 70 and the connection 470 therefore correspond to one another. This applies in the same manner to the DC connection 20 and the (selectable) connection 420.

A number of implementations have been described. Nevertheless, it will be understood that various modifications may be made without departing from the spirit and scope of the disclosure. Accordingly, other implementations are within the scope of the following claims.

What is claimed is:

1. A power circuit for supplying power in an electrically driven vehicle, the power circuit comprising:
    a DC voltage connection configured to connect the power circuit to an electrical clutch of the electrically driven vehicle, the DC voltage connection configured to transfer power bidirectionally;
    at least one DC/AC converter having an AC voltage side and a DC voltage side, the at least one DC/AC converter comprising an inverter of a charging apparatus;
    an electrical machine, the AC voltage side of the DC/AC converter connected to the electrical machine and forming an inverter for the electrical machine;
    at least one DC/DC converter having two converter sides, a first converter side being connected to the DC voltage side of the DC/AC converter via a linking point and the DC voltage connection being connected to the linking point, the at least one DC/DC converter configured to transmit power bidirectionally;
    a selection switch having a common connection connected to the AC voltage side of the DC/AC converter, the selection switch having a first connection connected to the electric machine and a second connection; and
    an AC voltage connection configured to connect to the second connection of the selection switch,
    wherein when the selection switch is connected to the first connection, the electric machine is configured to receive or transmit power;
    wherein when the selection switch is connected to the second connection, the power circuit feeds DC voltage to an AC network by way of the AC voltage connection or the AC voltage connection transmits power to the power circuit from the AC network.

2. The power circuit of claim 1, further comprising an energy store connection, a second converter side of the DC/DC converter connected to the energy store connection which connects to a vehicle-side energy store.

3. The power circuit of claim 1, wherein the DC/DC converter is set up to transmit energy in a bidirectional manner between the two converter sides.

4. The power circuit of claim 1, further comprising an AC voltage connection, the power circuit comprising an electrical machine or a connection for the latter, and the electrical machine having windings which can be disconnected from one another, the DC/AC converter being connected in series with the AC voltage connection via at least one winding.

5. The power circuit of claim 1, wherein the DC voltage connection and/or the battery connection having an isolating switch and/or an overload safety device.

6. The power circuit of claim 1, further comprising a changeover switch which controllably connects the DC voltage connection either to the linking point or to the battery connection and/or to a selection circuit which selectably connects the DC/AC converter to an electrical machine or a connection for the latter, to an internal AC voltage connection, to an external AC voltage connection and/or to a coil for inductive energy transmission.

7. The power circuit of in claim 6, further comprising a selection circuit, the selection circuit having a voltage detection unit which is connected to at least two of the following components: the electrical machine or the connection for the latter, the AC voltage connection, the DC voltage connection, the energy store connection and the coil for inductive energy transmission, the voltage detection unit also being set up to detect whether a voltage is applied to the relevant component in order to set the selection circuit, a frequency of the DC/AC converter and/or a voltage of the DC/AC converter according to a possible operating mode or a predefined desired operating mode.

8. The power circuit of claim 1, wherein the DC voltage connection and the AC voltage connection are the form of contacts of a common plug connection component which is designed according to IEC 62196.

9. The power circuit of claim 1, wherein the DC/AC converter and/or the DC/DC converter are designed to generate a controllably variable DC voltage at the linking point.

10. The power circuit of claim 1, wherein the DC/AC converter is equipped with a power detection device set up to respectively determine the energy which flows through the DC/AC converter for both flow directions.

* * * * *